3,133,965
N-SUBSTITUTED TRIS-HALOMETHYL
ACETAMIDES
August Amann and Wolfgang Jentzsch, Ludwigshafen (Rhine), and Gerald Neubauer, Frankenthal, Pfalz, Germany, assignors to Badische Anilin- & Soda-Fabrik Aktiengesellschaft, Ludwigshafen (Rhine), Germany
No Drawing. Filed Oct. 8, 1962, Ser. No. 229,164
Claims priority, application Germany Oct. 10, 1961
2 Claims. (Cl. 260—561)

This invention relates to new compounds with sedative and hypnotic properties to the general Formula I:

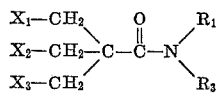

in which $X_1$, $X_2$ and $X_3$ are chlorine or bromine, $R_1$ is an aliphatic or cycloaliphatic radical and $R_2$ is either hydrogen or a radical linked to $R_1$ to form a heterocyclic ring with 3 to 7 atoms in the ring. Such compounds are, for example, the tris-chloro and tris-bromomethyl monoalkylacetamides with low molecular weight alkyl groups such as tris-chloromethyl-methylacetamide and the corresponding ethyl, propyl, butyl and tert. butylacetamides, tris-chloro, tris-bromomethyl, monocycloalkyl acetamides such as tris-chloromethyl cyclohexyl acetamide, and the tris-chloro and tris-bromomethyl acetamides with cyclic amido groups such as tris-chloromethyl acetopyrrolidide and the corresponding piperidide, morpholide, piperazide and phenothiazide. Compounds containing the amido radicals referred to but with different halogen atoms in the trimethylacetyl group are also included within the scope of this invention. Examples of such compounds are bischloromethyl bromomethyl methyl acetamide and chloromethyl bisbromomethyl ethylacetamide.

The Compounds I can be produced by conventional methods by treating tris-halomethylacetic acids or their functional derivatives such as acid halides or esters, with organic bases of the general Formula II:

in which $R_1$ and $R_2$ have the meanings given above.

The tris-halomethylacetic acids are obtainable according to the process described by A. Mooradian and J. B. Clooke by oxidation of pentaerythritol tris-halohydrins with concentrated nitric acid (J. Am. Chem. Soc., 67, 942 (1945). These acids can be used as such or can be first converted into their esters or acid halides which are obtainable according to conventional methods.

Compounds of the general Formula I with therapeutic properties are, for example, those in which the amide group is a low molecular weight alkylamino group such as that derived from methylamine, ethylamine, cyclohexylamine, piperidine, morpholine and phenothiazine.

We have now found that the new compounds have excellent sedative and hypnotic properties and are less toxic and have the same effect as chloral hydrate as shown by experiments with mice.

In these experiments the median lethal dose ($LD_{50}$), the median hypnotic dose ($HD_{50}$) and the median sedative dose ($SD_{50}$), the duration of sleep and the ratio of the median lethal dose to the median hypnotic dose were determined.

The results of the experiments are given in the table below:

| | $LD_{50}$ | | $HD_{50}$ | | | | $SD_{50}$, I.P. | $LD_{50}/HD_{50}$ | |
| | | | I.P. | | P.O. | | | | |
| | I.P. | P.O. | | Duration of sleep | | Duration of sleep | | I.P. | P.O. |
|---|---|---|---|---|---|---|---|---|---|
| A | 246 | 418 | 49 | 6 | 70 | 20 | 47 | 5.0 | 5.6 |
| B | 576 | 1,094 | 267 | 24.5 | | | 205 | 2.2 | |

The abbreviations used in the table have the following meanings:

A: Tris-chloromethyl methylacetamide, prepared as described in Example 1.
B: Chloral hydrate.
$LD_{50}$: Median lethal dose expressed in mg. substance per kg. body weight. The animals were observed over a period of 48 to 72 hours.
$HD_{50}$: Median hypnotic dose expressed as mg. substance per kg. body weight. The median hypnotic dose is defined as the dose required to produce the condition in which, after the animal has adopted the side position, it does not rise again on application of light pressure to the tail. The mean duration of sleep expressed in minutes was also measured.
$SD_{50}$: Median sedatve dose expressed as mg. substance per kg. body weight. The sedative dose is defined as the dose required to produce the condition in which the mouse falls out of a sloping cage of fine mesh wire netting, rotating at 6 r.p.m. and open at the bottom.
I.P.: intraperitoneal application.
P.O.: peroral application.
$LD_{50}/HD_{50}$: This ratio indicates how many times larger the median lethal dose is than the median hypnotic dose.

The substances were dissolved in distilled water using 1,3-butylene glycol and polyoxyethylenesorbitan monooleate as solubilizer and were administered in this form to the animals by oral and intraperitoneal application.

The therapeutic substances described in the invention can be administered in all the usual pharmaceutical and Galenic preparations by oral, rectal, subcutaneous, intramuscular, intravenous and intraperitoneal application.

The invention will be further illustrated by, but is not limited to, the following examples, in which parts are by weight.

*Example 1*

65 parts methylamine is passed into a solution of 230 parts trichloromethylacetyl chloride in 400 parts benzene at room temperature during four to five hours. The reaction mixture is then stirred for a further two to three hours. The precipitated methylammonium chloride is filtered off, the filtrate washed with distilled water until it contains no chloride ions, dried with anhydrous sodium sulphate and the benzene removed by cautious distillation. 204 parts pure tris-chloromethyl N-methylacetamide, M.P. 146° C., is obtained as residue.

*Example 2*

A solution of 119 parts tris-bromomethylacetyl chloride in 400 parts anhydrous benzene is treated at room temperature with 39 parts isopropylamine. On working up the reaction product as described in Example 1, 106 parts tris-bromomethyl N-isopropylacetamide, M.P. 162° C., is obtained.

We claim:
1. A compound of the formula

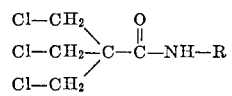

in which R is a lower alkyl group.

2. The compound of the formula

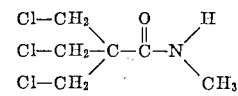

No references cited.